United States Patent
Godyak et al.

(10) Patent No.: US 8,487,544 B2
(45) Date of Patent: Jul. 16, 2013

(54) POWER SPLITTER CIRCUIT FOR ELECTRODELESS LAMP

(75) Inventors: Valery Godyak, Brookline, MA (US); Benjamin Alexandrovich, Brookline, MA (US); Robert Martin, Nicholasville, KY (US)

(73) Assignee: Osram Sylvania Inc., Danvers, MA (US)

( * ) Notice: Subject to any disclaimer, the term of this patent is extended or adjusted under 35 U.S.C. 154(b) by 546 days.

(21) Appl. No.: 12/893,628

(22) Filed: Sep. 29, 2010

(65) Prior Publication Data

US 2012/0074855 A1    Mar. 29, 2012

(51) Int. Cl.
*H05B 41/16*    (2006.01)

(52) U.S. Cl.
USPC ........................................... 315/248

(58) Field of Classification Search
USPC .......... 315/189, 248, 58, 278, 209 R, DIG. 4, 315/DIG. 7
See application file for complete search history.

(56) References Cited

U.S. PATENT DOCUMENTS

| | | | |
|---|---|---|---|
| 4,972,126 A * | 11/1990 | Nilssen ........................ | 315/324 |
| 4,987,342 A | 1/1991 | Godyak | |
| 5,019,750 A | 5/1991 | Godyak | |
| 5,027,041 A | 6/1991 | Godyak et al. | |
| 5,146,140 A | 9/1992 | Piejak et al. | |
| 5,177,407 A | 1/1993 | Godyak | |
| 5,289,085 A | 2/1994 | Godyak et al. | |
| 5,300,860 A | 4/1994 | Godyak et al. | |
| 5,325,024 A | 6/1994 | Piejak et al. | |
| 5,381,073 A | 1/1995 | Godyak et al. | |
| 5,539,283 A | 7/1996 | Piejak et al. | |
| 5,717,290 A | 2/1998 | Shaffer | |
| 5,719,547 A | 2/1998 | Kaneko et al. | |
| 5,834,905 A * | 11/1998 | Godyak et al. ................ | 315/248 |
| 5,886,472 A | 3/1999 | Alexandrovich et al. | |
| 6,433,492 B1 * | 8/2002 | Buonavita .................... | 315/248 |
| 6,731,059 B2 | 5/2004 | Piejak | |
| 6,809,483 B2 | 10/2004 | Alexandrov | |
| 6,819,057 B2 | 11/2004 | Alexandrov | |
| 7,119,486 B2 | 10/2006 | Godyak et al. | |
| 7,180,230 B2 | 2/2007 | Godyak et al. | |
| 7,312,583 B2 * | 12/2007 | Kim et al. .................... | 315/212 |
| 2005/0280344 A1 | 12/2005 | Godyak et al. | |

OTHER PUBLICATIONS

Sylvania Icetron Quicktronic Design Guide, "Inductively Coupled Electrodeless Lighting System", pp. 1-36, published Jul. 2004, USA, available at http://www.lithonia.com/Micro_Webs/induction/ICETRON.pdf.

* cited by examiner

*Primary Examiner* — Minh D A
(74) *Attorney, Agent, or Firm* — Shaun P. Montana (57) ABSTRACT

A lamp assembly adapted to operate as one of a total number of lamp assemblies that are connected together in series and connected to a ballast. The lamp assembly comprises an electrodeless, closed-loop, tubular lamp envelope enclosing mercury vapor and a buffer gas, and a transformer core disposed around a portion of the lamp envelope. An input winding is disposed on the transformer core so that it has a particular number of turns, $N_{input}$. An auxiliary winding is disposed on the transformer core so that it has a particular number of turns, $N_{auxiliary}$. The auxiliary winding is adapted to connect to the ballast and to couple with the input winding. The ratio of the particular number of turns $N_{input}$ to the particular number of turns $N_{auxiliary}$ is substantially proportional to the total number of lamp assemblies that are adapted to operate in series together.

20 Claims, 7 Drawing Sheets

POWER SPLITTER CIRCUIT FOR ELECTRODELESS LAMP

TECHNICAL FIELD

The present invention generally relates to low pressure, electrodeless discharge lamps. More particularly, the invention is directed to a power splitter circuit to split radio frequency power supplied by a ballast among a plurality of low pressure, electrodeless discharge lamps connected to the ballast.

BACKGROUND

Very high output (VHO) fluorescent lamp systems provide efficient, high lumen output, and good color rendering. A VHO fluorescent lamp includes an electrode at each end of a fluorescent tube, however, the electrodes substantially limit the life of a typical VHO fluorescent lamp. Another type of lamp system is an electrodeless gas discharge lamp system which includes an inductively coupled fluorescent lamp and a high frequency ballast. Electrodeless gas discharge lamp systems use electromagnetic induction instead of an electrode at each end of a fluorescent tube. Since the electrodeless gas discharge lamps do not include electrodes, the electrodeless gas discharge lamps provide many of the same benefits as the VHO fluorescent lamp systems while additionally providing a longer lamp life.

Multiple electrodeless gas discharge lamps are commonly used to illuminate a single location. A single high frequency ballast is typically used to power each electrodeless gas discharge lamp.

SUMMARY

Conventional ballasts for operating a single electrodeless gas discharge lamp suffer from a variety of deficiencies. For example, in situations such as when a plurality of electrodeless gas discharge lamps are used to illuminate a large area, such as a tunnel, it would be desirable to operate the electrodeless gas discharge lamps at a reduced power level to avoid excessive light. Doing so with a number of conventional ballasts, each operating only a single electrodeless gas discharge lamp, is problematic at best. Additionally, it would be more economical to have a single ballast that could be adapted to power multiple electrodeless gas discharge lamps, instead of having a one-to-one lamp-to-ballast ratio.

Embodiments of the invention relate to a power splitter circuit to split power provided by a single ballast among a plurality of lamp assemblies that are connected together in series. As such, embodiments provide an electric lamp system in which the intensity of the light generated by the electric lamp system is distributed among a plurality of lamp assemblies. For example, the power splitter circuit may be used to allow a ballast that is designed to power a single lamp assembly at a first power level to power two lamp assemblies, each at a second power level that is reduced relative to the first power level. As such, in accordance with embodiments of the invention, the power splitter circuit allows a ballast to be converted so that it provides distributed light.

In an embodiment, there is provided a lamp assembly adapted to operate as one of a total number of lamp assemblies that are connected together in series and connected to a ballast. The lamp assembly includes: an electrodeless, closed-loop, tubular lamp envelope enclosing mercury vapor and a buffer gas; a transformer core disposed around a portion of the lamp envelope; an input winding disposed on the transformer core, the input winding having a particular number of turns, $N_{input}$; and an auxiliary winding disposed on the transformer core and adapted to connect to the ballast and to couple with the input winding, the auxiliary winding having a particular number of turns, $N_{auxiliary}$. A ratio of the particular number of turns $N_{input}$ to the particular number of turns $N_{auxiliary}$ is substantially proportional to the total number of lamp assemblies that are adapted for operating in series together.

In a related embodiment, the transformer core may be a first transformer core and the input winding may be a first input winding, and the first transformer core, the first input winding, and the auxiliary winding may form a first driving inductor, and the lamp assembly may further include a second driving inductor having a second transformer core disposed around another portion of the lamp envelope and a second input winding disposed on the second transformer core and adapted to connect to the ballast.

In another related embodiment, the second input winding may have a particular number of turns, $N_{input}$, equal to the particular number of turns of the first input winding. In yet another related embodiment, the lamp assembly may further include a load balancing capacitor connected to the transformer core and adapted to connect to the ballast. In still another related embodiment, the input winding may have a center tap that is connected to a ground conductor.

In another embodiment, there is provided an electric lamp system. The electric lamp system includes: a ballast adapted to power a total number of one or more lamp assemblies connected to the ballast, wherein the ballast supplies to the one or more lamp assemblies a predetermined radio frequency power that is independent of the total number of the one or more lamp assemblies that are connected to the ballast; and a plurality of lamp assemblies adapted to connect together in series and to connect to the ballast, wherein each of the plurality of lamp assemblies includes an electrodeless gas discharge lamp, and each of the plurality of lamp assemblies includes a driving inductor configured to split the radio frequency power among each of the plurality of electrodeless gas discharge lamps to produce a discharge in the lamp envelope from the split radio frequency power.

In a related embodiment, the driving inductor of each of the plurality of lamp assemblies may include: a transformer core disposed around a portion of the lamp envelope; an input winding disposed on the transformer core, the input winding having a particular number of turns, $N_{input}$; and an auxiliary winding disposed on the transformer core and adapted to connect to the ballast and to couple with the input winding, the auxiliary winding having a particular number of turns, $N_{auxiliary}$; and the particular number of turns, $N_{input}$, of the input winding and the particular number of turns, $N_{auxiliary}$, of the auxiliary winding may be selected so that the driving inductor splits the radio frequency power among each of the plurality of electrodeless gas discharge lamps. In a further related embodiment, the input winding may have a center tap that is connected to a ground conductor.

In another related embodiment, the driving inductor may include a first driving inductor having a transformer core disposed around a first portion of the lamp envelope, and the driving inductor may include a second driving inductor having a transformer core disposed around a second portion of the lamp envelope.

In yet another related embodiment, the electric lamp system may further include a plurality of load balancing capacitors, wherein each load balancing capacitor of the plurality of load balancing capacitors may correspond to one of the electrodeless gas discharge lamps, and each load balancing capacitor may be connected between the electrodeless gas discharge lamp and the ballast. In still another related embodiment, the electric lamp system may further include a load balancing capacitor connected between the ballast and the plurality of lamp assemblies.

In another embodiment, there is provided an interconnect circuit adapted to connect between a ballast and a lamp set. The interconnect circuit includes: an input terminal adapted to connect to the ballast and to receive an input current from the ballast, and a current transformer configured to generate an output current to a lamp set that has a particular total number of series-connected lamp assemblies by stepping down the input current received from the ballast as a function of the particular total number of the series-connected lamp assemblies. The current transformer includes: a current transformer core; a first current transformer primary winding and a second current transformer primary winding, wherein the first and second current transformer primary windings are bifilar-wound around the current transformer core; and a current transformer secondary winding single wound around the current transformer core, wherein the current transformer secondary winding has a particular number of windings $N_{secondary}$ selected as a function of the particular number of the series-connected lamp assemblies in the lamp set. The interconnect circuit also includes an output terminal adapted to connect to the lamp set and to provide the output current generated by the current transformer to the lamp set.

In a related embodiment, the interconnect circuit may further include a load balancing capacitor connected at the input terminal and to the current transformer. In another related embodiment, the interconnect circuit may further include a load balancing capacitor connected at the output terminal and to the current transformer. In still another related embodiment, the ballast may be a radio frequency converter and each of the series-connected lamp assemblies may include an electrodeless gas discharge lamp.

In another embodiment, there is provided an electric lamp system. The electric lamp system includes: a ballast adapted to power one or more lamp assemblies, wherein the ballast supplies radio frequency power independent of a quantity of the one or more lamp assemblies that are powered from the ballast; a lamp set of lamp assemblies that are adapted to connect together in series, wherein each lamp assembly in the lamp set includes an electrodeless gas discharge lamp having a closed-loop, tubular lamp envelope enclosing mercury vapor and a buffer gas, and each lamp assembly in the lamp set includes a first driving inductor and a second driving inductor, wherein the lamp set has a total number of the electrodeless gas discharge lamps; and a transformer connected between the ballast and the lamp set, wherein the transformer is configured to split the radio frequency power supplied by the ballast among each of the electrodeless gas lamps in the lamp set. The first and second driving inductors of each of the lamp assemblies of the lamp set are configured to receive the split radio frequency power from the transformer and to produce a discharge in the lamp envelope.

In a related embodiment, the transformer may be configured to step down current provided by ballast as a function of total number of electrodeless gas discharge lamps in the lamp set. In another related embodiment, the transformer may be a bifilar-wound transformer. In still another embodiment, the electric lamp system may further include a load balancing capacitor connected between the transformer and the ballast. In yet another related embodiment, the electric lamp system may further include a plurality of load balancing capacitors, wherein each load balancing capacitor of the plurality of load balancing capacitors may correspond to one of the electrodeless gas discharge lamps of the lamp set, and each load balancing capacitor may be connected between the transformer and electrodeless gas discharge lamp.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

The present invention relates to an electric lamp system in which power supplied by a single ballast is split among a plurality of lamp assemblies that are connected together in series and to the ballast. Embodiments light produced from the power supplied by the ballast to be distributed via each of a plurality of series-connected lamp assemblies. In some embodiments, the ballast, such as a radio frequency (RF) power converter, has an output (e.g., one or more output terminals) adapted to directly connect to a single lamp assembly and supply RF power (e.g., RF current, RF voltage) thereto. The RF power supplied by the ballast at the output is predefined, independent of the total number of lamp assemblies that may be connected together in series at the ballast output. Each lamp assembly includes an electrodeless discharge lamp and a driving inductor to couple RF power supplied by the ballast to the electrodeless discharge lamp so that light is emitted therefrom. A power splitter circuit is connected between the electrodeless discharge lamp and the ballast in order to split the power between each of the electrodeless discharge lamps of the electric lamp system.

Figure 1:
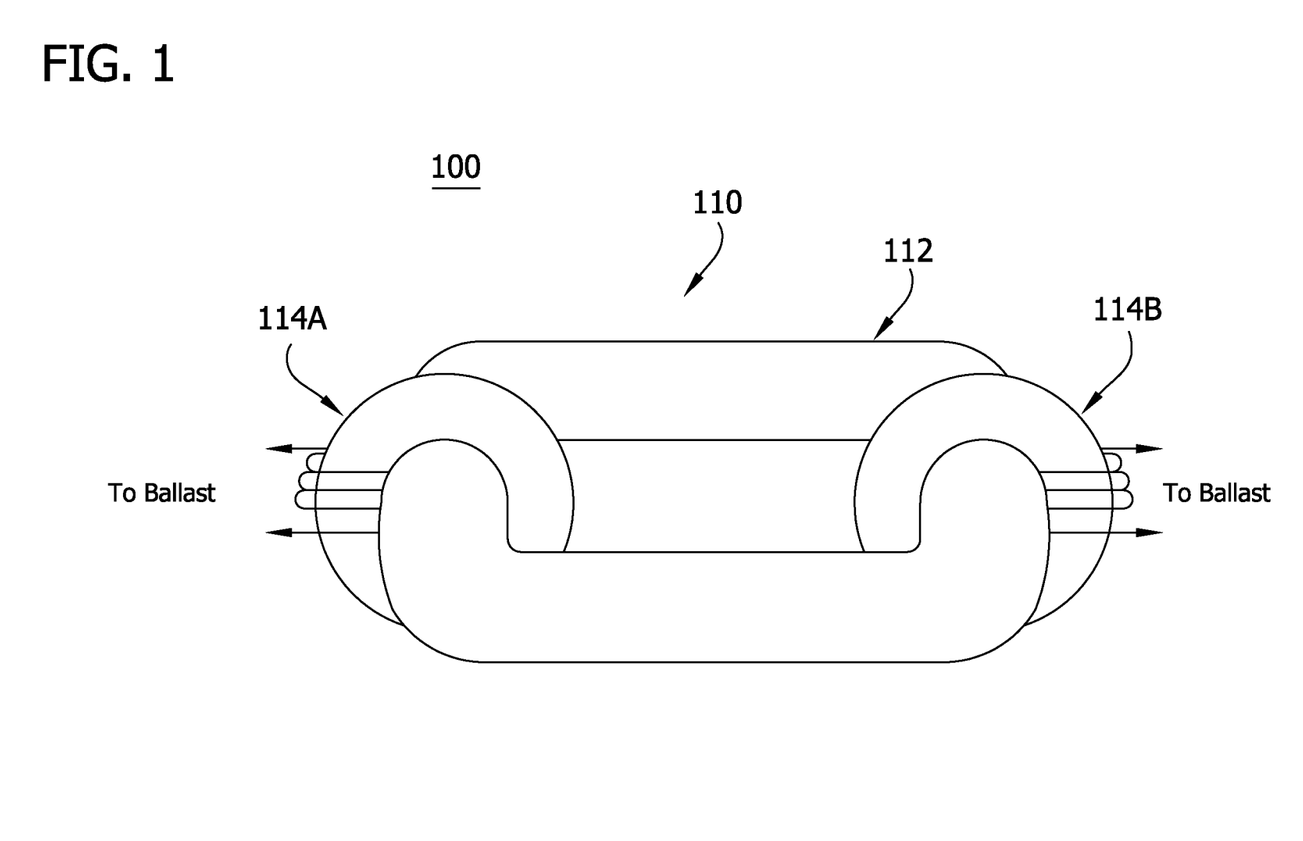
FIG. 1 shows a lamp assembly having an electrodeless gas discharge lamp according to embodiments disclosed herein.
Figure 2:
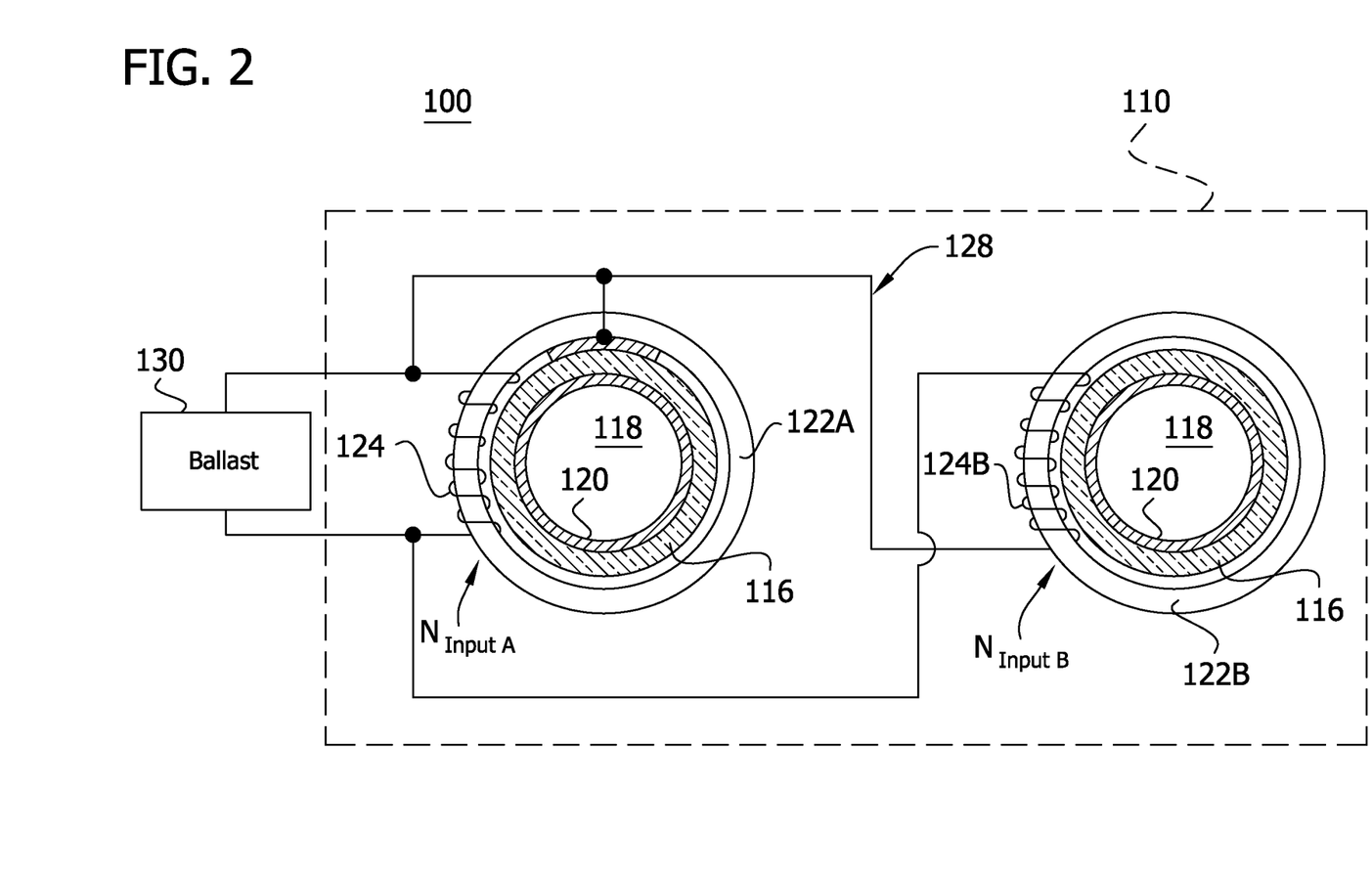
FIG. 2 is a schematic diagram of an electric lamp system according to embodiments disclosed herein.

FIG. 1 and FIG. 2 illustrate a lamp system 100. A lamp assembly 110 is adapted to connect to a ballast 130 (shown in FIG. 2) and to receive RF power from the ballast 130. For example, the lamp assembly 110 may be an ICETRON® lamp and the ballast may be a QUICKTRONIC® electronic ballast, both available from OSRAM SYLVANIA Inc. As shown in FIG. 1, the lamp assembly 110 includes an electrodeless discharge lamp 112 and a driving inductor 114. Referring generally to FIG. 2, the electrodeless discharge lamp 112 has a tubular closed-loop lamp envelope 116 that forms a discharge region 118. The discharge region 118 encloses a buffer gas and a mercury vapor. The buffer gas may be a noble gas such as but not limited to krypton or argon. The lamp envelope 116 has an inside surface and an outside surface. The inside surface of the lamp envelope 116 has a phosphor coating 120 formed thereon, and is in contact with the discharge region 118. A driving inductor 114, shown in FIG. 1, includes a transformer core 122 disposed around a portion of the lamp envelope 116 and an input winding 124 disposed on the transformer core 122. As further discussed below, in operation, the driving inductor 114 inductively couples the electrodeless discharge lamp 112 to the ballast 130 to power the electrodeless discharge lamp 112.

The illustrated lamp assembly 110 includes a first driving inductor 114A and a second driving inductor 114B, both shown in FIG. 1. However, it should be noted that embodiments of the invention may include any number of one or more driving inductors 114. The first driving inductor 114A has a first transformer core 122A disposed around a first portion of the outside surface of the lamp envelope 116. The second driving inductor 114B has a second transformer core 122B disposed around a second portion of the outside surface of the lamp envelope 116. In some embodiments, the first and second transformer cores 122A and 122B each form a closed loop around the outside surface of the lamp envelope 116 and have a torodial configuration. The first and second transformer cores 122A and 122B may be fabricated of a high permeability, low loss ferrite material, such as but not limited to manganese zinc ferrite.

The first driving inductor 114A has a first input winding 124A wound around the first transformer core 122A such that it has a particular number of turns, $N_{inputA}$. Similarly, the second driving inductor 114B has a second input winding 124B wound around the second transformer core 122B such that it has a particular number of turns, $N_{inputB}$. In some embodiments, the particular number of turns $N_{inputA}$ of the first input winding 124A and the particular number of turns $N_{inputB}$ of the second input winding 124B are equal. One or more conductors (e.g., lead wires, conductive strip) electrically connect the first and second input windings 124A and 124B together. In the illustrated lamp assembly 110, the first input winding 124A and the second input winding 124B are connected in parallel. The one or more conductors (e.g., lead wires, conductive strip), generally indicated at 128, are adapted for electrically connecting the first and second input windings 124A and 124B to the ballast 130, and may also serve as starting aids to initiate discharge in the electrodeless discharge lamp 112.

In operation, the first and second driving inductors 114A and 114B receive RF energy from the ballast 130, and in response thereto, produce a discharge (e.g., plasma) within the lamp envelope 116. Thus, RF energy is inductively coupled to the discharge within the lamp envelope 116 by the first and second driving inductors 114A and 114B. In particular, the first and second input windings 124A and 124B receive RF current from the ballast 130. In some embodiments, the first and second input windings 124A and 124B are driven in phase. The RF current through each of the first and second input windings 124A and 124B creates a time-varying magnetic flux that induces a voltage along the lamp envelope 116. The first and second driving inductors 114A and 114B are positioned on the lamp envelope 116 such that the voltages induced therefrom add together. The total induced voltage (i.e., discharge voltage) in the lamp envelope 116 maintains a discharge within the lamp envelope 116. As such, the first and second input windings 124A and 124B act as primary circuits for the respective first and second transformer cores 122A and 122B. The discharge acts a secondary circuit (e.g., one-turn secondary winding) for both the first and the second transformer cores 122A and 122B. Each driving inductor 114A, 114B is thus configured to step down primary voltage and to step up primary current.

The discharge produced in the lamp envelope 116 emits ultraviolet radiation. In accordance with the illustrated electrodeless discharge lamp 112, the phosphor coating 120 on the inside surface of the lamp envelope 116 converts the ultraviolet radiation to visible light. In such embodiments, the lamp envelope 116 is fabricated of a material, such as but not limited to glass, that transmits visible light. In alternate embodiments, the electrodeless discharge lamp 112 may be used as a source of ultraviolet radiation. In such embodiments, the phosphor coating 120 is omitted from the lamp envelope 116 and the lamp envelope 116 is fabricated of an ultraviolet-transmissive material, such as but not limited to quartz.

Figure 3:
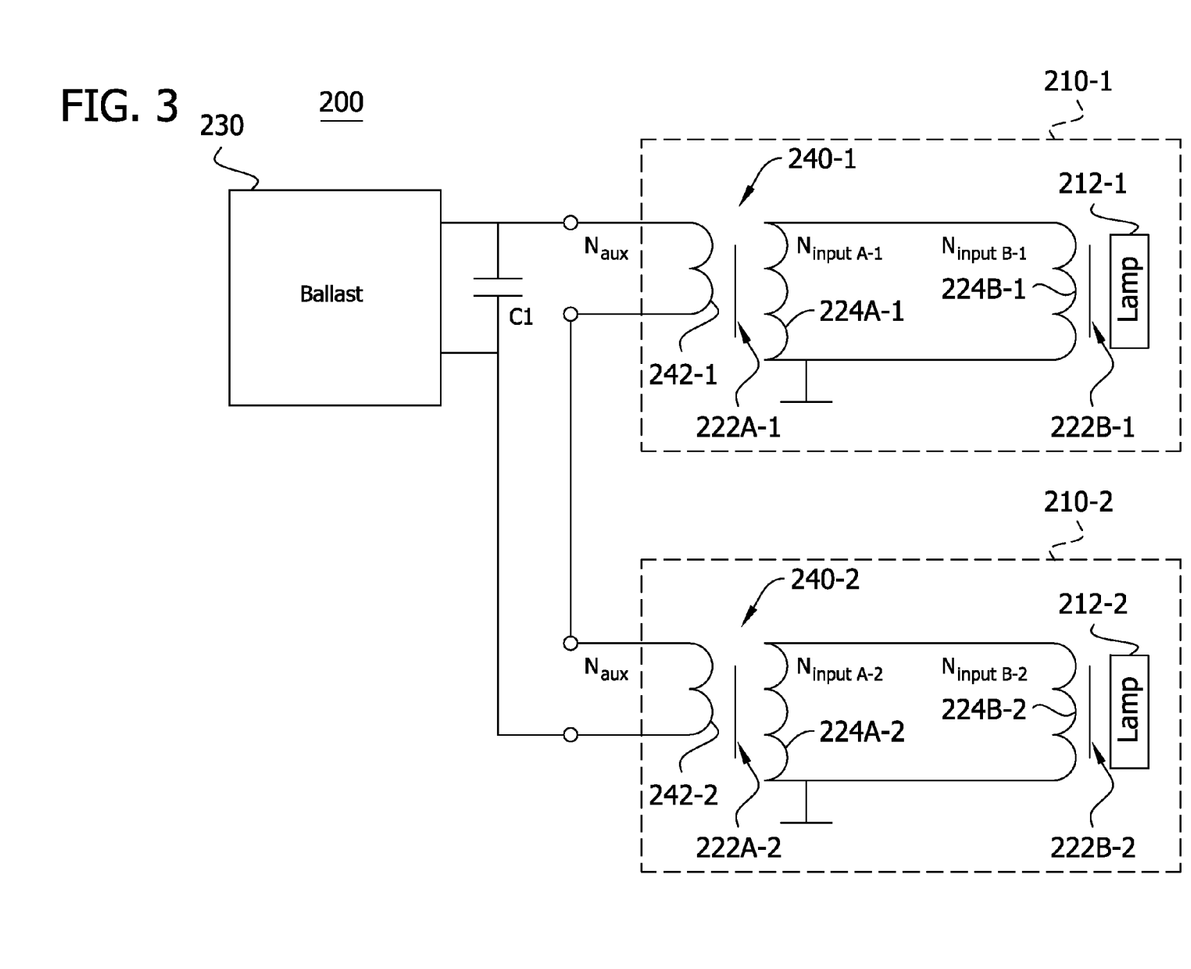
FIGS. 3-5 each show a schematic diagram of an electric lamp system in which each lamp assembly includes a power splitter circuit according to embodiments disclosed herein.

Referring generally to FIG. 3, in some embodiments, the lamp assembly 210 is adapted to operate, in an electric lamp system 200, as one of a predefined total number of lamp assemblies powered by a single ballast 230 to provide distributed light. In addition to the features discussed above in connection with FIGS. 1 and 2, each lamp assembly 210 in the electric lamp system 200 includes a power splitter circuit configured to split the RF power supplied from the ballast 230 by the predefined total number of lamp assemblies. As such, the RF power supplied from the ballast 230 is split between lamps 212-1, 212-2, etc. in the electric lamp system 200. In some embodiments, current received by the electrodeless gas discharge lamps remains substantially constant independent of the load (e.g., number of electrodeless gas discharge lamps), and the electrodeless gas discharge lamps act as non-linear loads so that the discharge voltage produced by each of the electrodeless gas discharge lamps remains substantially constant independent of the received current.

FIG. 3 is a simplified partial block, partial circuit diagram of an exemplary lamp system 200 adapted to provide distributed light via two lamp assemblies, 210-1 and 210-2. The electric lamp system 200 includes two lamp assemblies, 210-1 and 210-2, connected together in series and to the ballast 230. Each of the lamp assemblies 210-1 and 210-2 includes a power splitter circuit (generally indicated at 240-1 and 240-2) configured to split the RF power supplied from the ballast 230 in half so that the RF power supplied from the ballast 230 is divided substantially evenly among the two lamp assemblies 210-1 and 210-2 in the electric lamp system 200.

In particular, each lamp assembly 210 includes an auxiliary winding 242 wound around the first transformer core 222A such that it has a particular number of turns, $N_{aux}$. The auxiliary winding 242 is adapted to connect to the ballast 230 and to couple with a first input winding 224A. Together, the first transformer core 222A, the first input winding 224A, and the auxiliary winding 242 form a power splitter circuit 240 that steps down RF current supplied by the ballast 230. According to ideal transformer principles, the RF current is stepped down by a factor equal to the ratio (i.e., $N_{input}:N_{aux}$, $N_{input}/N_{aux}$) of the particular number of turns $N_{input}$ to the particular number of turns $N_{aux}$. As such, in order to divide the RF current substantially evenly among each lamp assembly 210 in the electric lamp system 200, the ratio $N_{input}/N_{aux}$ should be equal to the number of electric lamp assemblies 210 in the lamp system. For example, applying the ideal transformer principles to the electric lamp system 200 shown in FIG. 3, the ratio $N_{input}/N_{aux}$ would be equal to two. However, as generally known to be the case with transformers, the ideal transformer principles provide approximate values that may be adjusted based on non-ideal factors such as magnetizing inductance and magnetic flux leak that occur during operation. In order to account for such factors in embodiments of the invention, the ratio $N_{input}/N_{aux}$ is characterized as being substantially proportional (e.g., substantially directly proportional, substantially equal) to the total number of lamps that are adapted to operate in series together.

As illustrated in the electric lamp system 200, in some embodiments a load balancing capacitor C1 is connected between the lamp assemblies 210 and the ballast 230. For example, the load balancing capacitor C1 may be integrally formed as part of the ballast 230. Alternatively, the electric lamp system 200 may include an interface circuit (not illustrated in FIG. 3) formed separately from the ballast 230 and the lamp assemblies 210 so that the interface circuit, the ballast 230, and the lamp assemblies 210 are all separate components. According to this configuration, the interface circuit includes the load balancing capacitor C1 to connect between the ballast 230 and the lamp assemblies 210.

In operation, the first transformer core 222A and the second transformer core 22B are non-ideal transformers, and as such, exhibit finite magnetizing inductance. The magnetizing inductance acts as an inductive component electrically connected in parallel with the load (e.g., the lamp assembly 210-1 containing active electrodeless gas discharge lamp 212-1). When a plurality of series connected lamp assemblies 210-1, 210-2, each including an electrodeless gas discharge lamp 212-1, 212-2, are connected to the ballast 230 to operate at a lower power, the inductive component is decreased proportional to the plurality of series connected lamps assemblies 210-1, 210-2, each including an electrodeless gas discharge lamp 212-1, 212-2. The load balancing capacitor C1 compensates for the decrease in the inductance. Thus, the load balancing capacitor C1 serves to compensate for the distribution of the load that results from splitting the RF power from the ballast 230 among each of the lamp assemblies 210-1, 210-2. For example, in the illustrated electric lamp system 200, the load balancing capacitor C1 causes the total impedance of the electric lamp system 200 having two lamp assemblies 210-1 and 210-2 to match (i.e., approximately match) that of an electric lamp system having a single lamp assembly.

Figure 4:
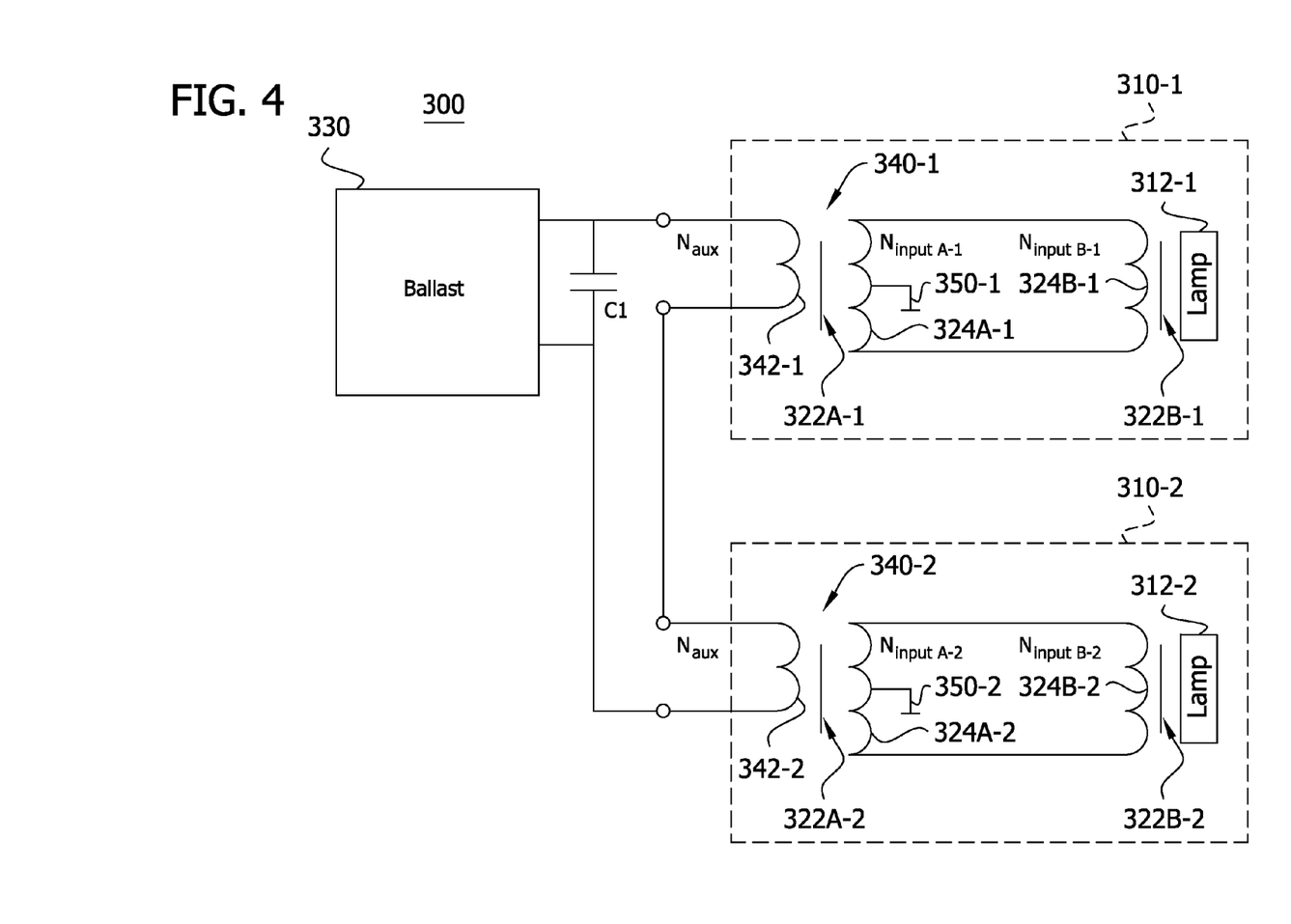
Figure 5:
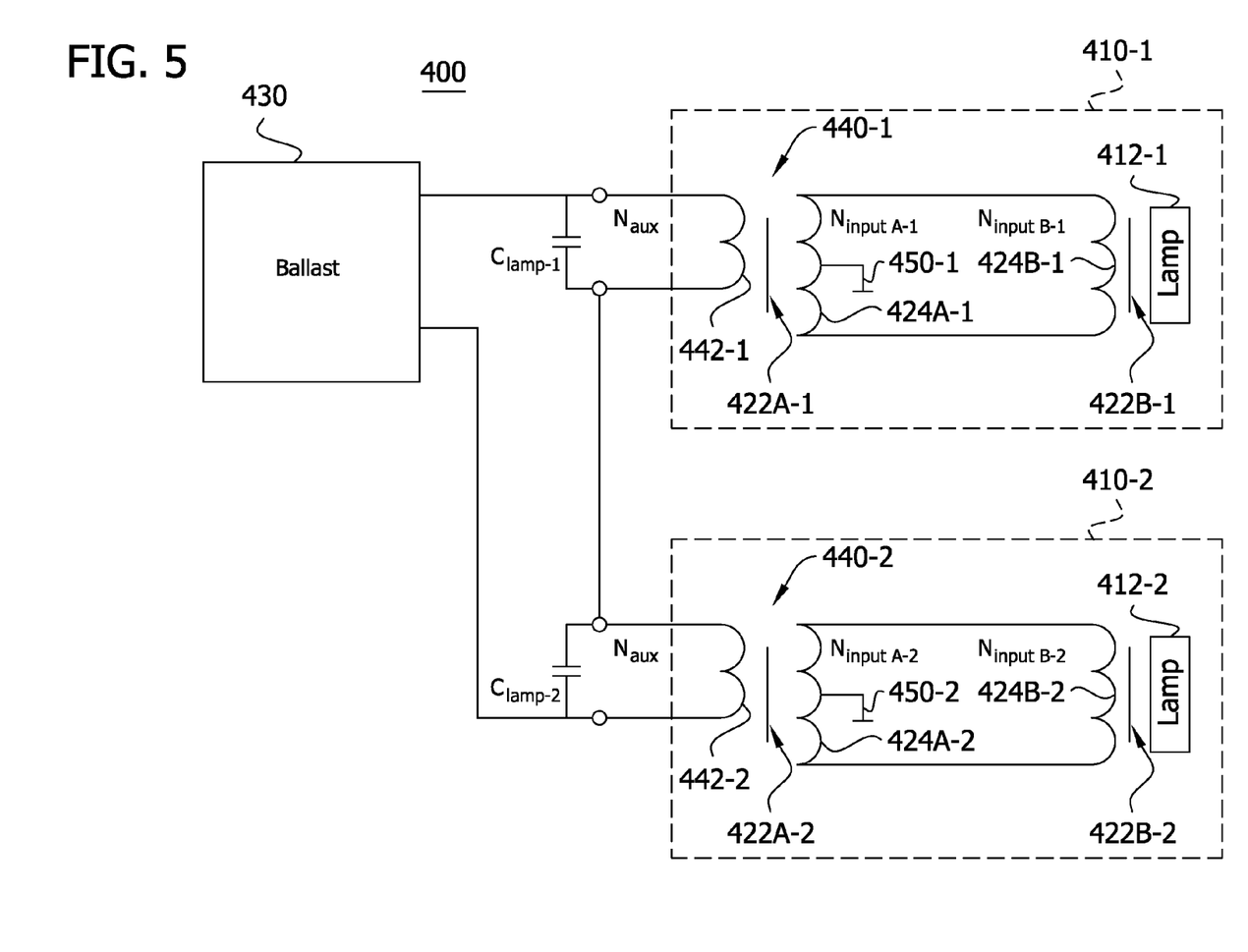

In some embodiments, such as an electric lamp system 300 of FIG. 4, a first input winding 324A in each lamp assembly 310 has a center tap 350 that is connected to a ground conductor. The center tapped input winding 324A minimizes electromagnetic interference (EMI) that may be present in the lamp assembly 310. In other embodiments, such as an electric lamp system 400 of FIG. 5, rather than having a single load balancing capacitor connected between the plurality of lamp assemblies and the ballast (as in FIGS. 3-4), each lamp assembly 410 includes a load balancing capacitor $C_{lamp}$ connected between an auxiliary winding 442 and a ballast 430. This configuration reduces any residual difference in discharge current between electrodeless gas discharge lamps 410-1, 410-2, which may occur due to variation of magnetizing inductance of transformer cores 440 in each of the lamp assemblies 410.

Figure 6:
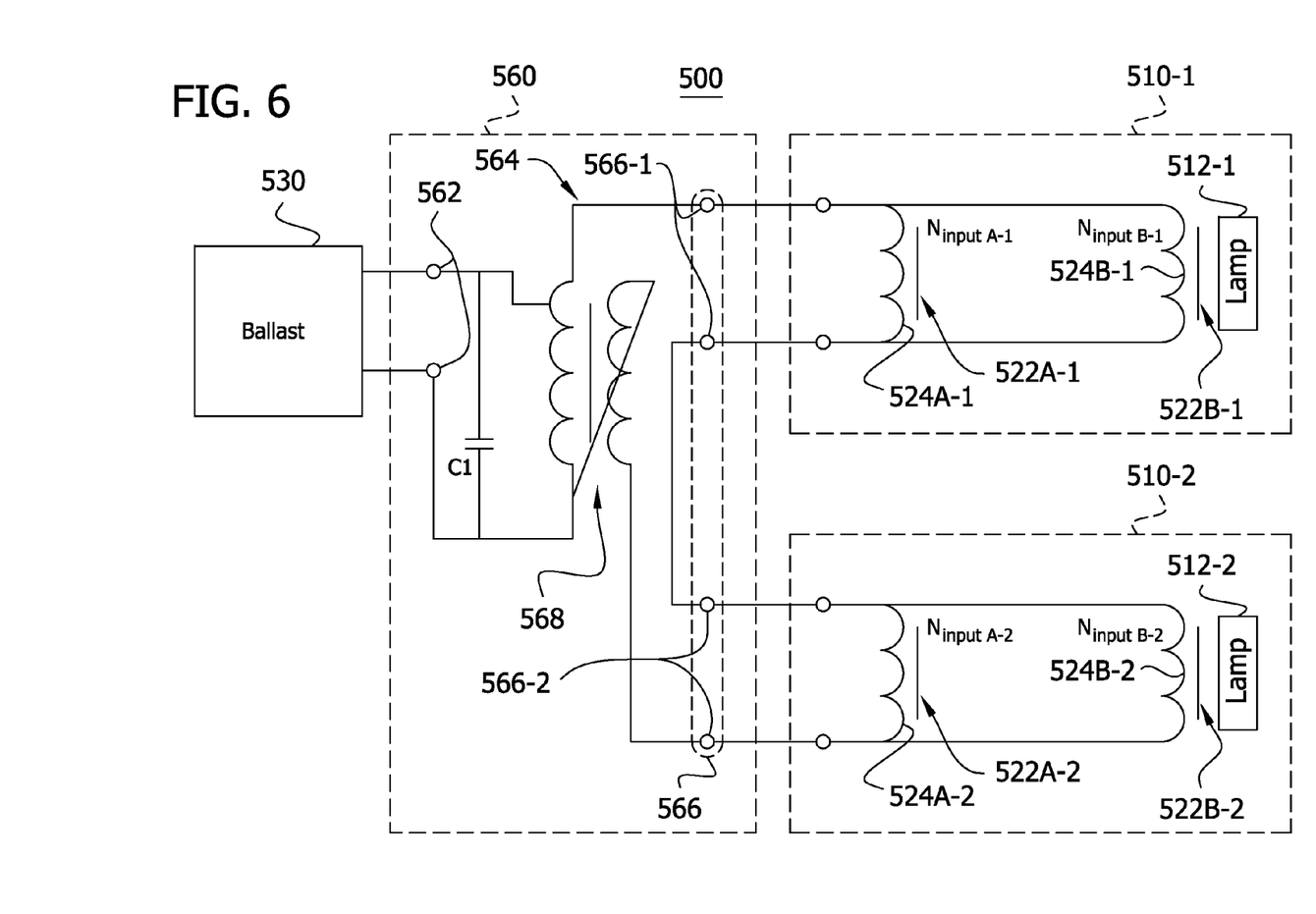
FIGS. 6-7 each show a schematic diagram of a lamp system having an interconnect circuit according to embodiments disclosed herein.

Referring to FIG. 6, in other embodiments the electric lamp system 500 includes an interconnect circuit 560 adapted to connect between a ballast 530 and a plurality of lamp assemblies (i.e., "lamp set") 510. For example, the interconnect circuit 560 may be formed separately from the ballast 530 and the lamp assemblies 510 such that the interconnect circuit 560, the ballast 530, and the lamp assemblies 510 are separate components. The interconnect circuit 560 is configured to split the RF power supplied from the ballast 530 between each lamp assembly 510 of the lamp set in order to provide distributed light. In the electric lamp system 500, the interconnect circuit 560 is configured to split the RF power supplied from the ballast 530 between two lamp assemblies 510-1 and 510-2. The two lamp assemblies 510-1 and 510-2 are electrically connected together in series.

The interconnect circuit 560 includes an input terminal 562, a current transformer 564, and an output terminal 566. The input terminal 562 is adapted to electrically connect to the ballast 530 and to receive an input current therefrom. The current transformer 564 is configured to generate an output current by stepping down the current received from the ballast 530 as a function of the number of lamp assemblies in the lamp set. In some embodiments, the current transformer 564 is configured to operate in a lamp system having a predefined number of lamp assemblies. Thus, the current transformer 564 is configured to step down the current received from the ballast 530 by a factor equal to the predefined number of lamp assemblies. The output terminal 566 is adapted to connect to the lamp set. For example, the output terminal 566 may include a set of output terminals 566-1, 566-2 to electrically connect each lamp assembly 510-1, 510-2 in the lamp set to the current transformer 564. As such, the output current generated by the current transformer 564 is provided to the lamp assemblies 510 in the lamp set.

In some embodiment, the current transformer 564 is a bifilar coil. Such a bifilar winding reduces electro-magnetic emission (EMI). In such cases, a bifilar coil serves to mitigate the common mode conducted interferences into the mains. The current transformer 564 has a core 568 ("current transformer core"). For example, the current transformer core 568 is formed from a ferrite material so that it has a magnetizing inductance greater than that of the lamp assemblies 510. A first current transformer primary winding and a second current transformer primary winding are bifilar-wound around the current transformer core 568 such that the first and second primary windings have a particular number $N_{primary}$ of turns. A current transformer secondary winding is single wound around the current transformer core 568 so that it has a particular number $N_{secondary}$ of turns. A ratio, R, of the particular number of turns of the primary and secondary windings defines the step down factor of the current received from the ballast 530 as follows:

$$R = \frac{N_{primary}}{2 * N_{secondary}}$$

Accordingly, the number of turns of each of the windings, $N_{primary}$ and $N_{secondary}$, may be selected as a function of the number of lamp assemblies in the electric lamp system 500 so that the current is stepped down accordingly. In some embodiments, the number of turns of the primary winding $N_{primary}$ is selected to minimize transformer loss, and the number of turns for the secondary winding $N_{secondary}$ is then selected as a function of the number of turns of the primary winding $N_{primary}$ and the number of lamp assemblies in the electric lamp system 500.

The electric lamp system 500 includes a load balancing capacitor C1 connected across the input terminal 562 and between the current transformer 564 and the ballast 530. The load balancing capacitor C1 may be included in the ballast 530 or, alternatively, included in the interconnect circuit 560 as shown in FIG. 6. As discussed above in connection with FIG. 3, the load balancing capacitor C1 serves to compensate for the distribution of the load that results from splitting the RF power from the ballast 530 among each of the lamp assemblies 510. For example, in the electric lamp system 500, the load balancing capacitor C1 causes the total impedance of the electric lamp system 500 having two lamp assemblies 510-1, 510-2 to match (i.e., approximately match) that of an electric lamp system having a single lamp assembly.

Figure 7:
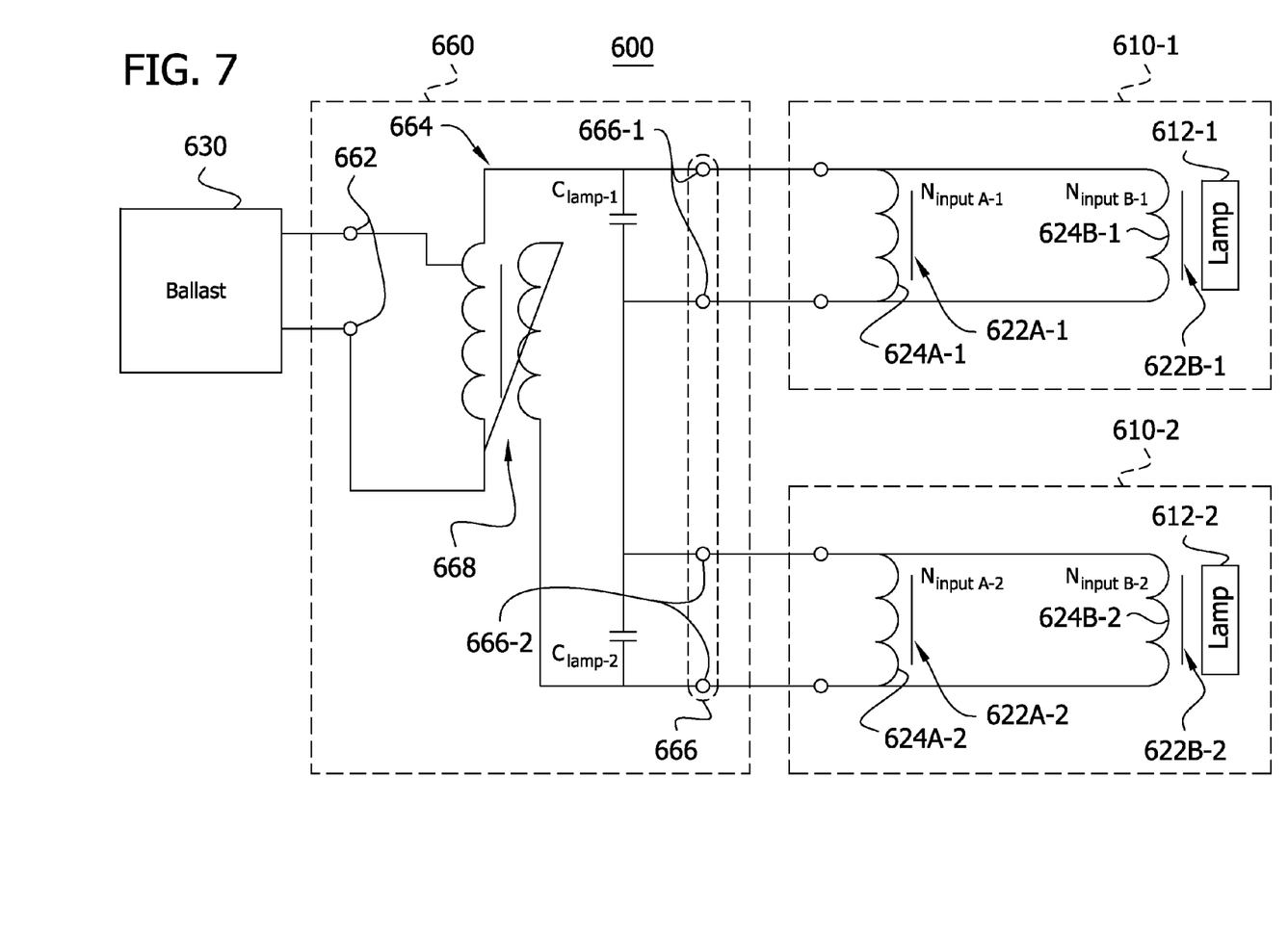

Rather than having a single load balancing capacitor C1 connected between the current transformer 564 and the ballast 530 as shown in FIG. 6, in an electric lamp system 600 of FIG. 7, a load balancing capacitor $C_{lamp}$ is connected between each output terminal set 666-1, 666-2, and the corresponding lamp assembly 610-1, 610-2. Thus, each lamp assembly 610 has a corresponding capacitor $C_{lamp}$. The load balancing capacitors $C_{lamp}$ may be included in the ballast 630 or, alternatively, included in the interconnect circuit 660 as shown in FIG. 7. This configuration reduces any residual difference in discharge current between the electrodeless gas discharge lamps 610-1, 610-2 that may occur due to variation of magnetizing inductance of the transformer cores 640 in each of the lamp assemblies 610.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a", "an", and "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lamp assembly adapted to operate as one of a total number of lamp assemblies that are connected together in series and connected to a ballast, the lamp assembly comprising:
    an electrodeless, closed-loop, tubular lamp envelope enclosing mercury vapor and a buffer gas;
    a transformer core disposed around a portion of the lamp envelope;
    an input winding disposed on the transformer core, the input winding having a particular number of turns, $N_{input}$; and
    an auxiliary winding disposed on the transformer core and adapted to connect to the ballast and to couple with the input winding, the auxiliary winding having a particular number of turns, $N_{auxiliary}$;
    wherein a ratio of the particular number of turns $N_{input}$ to the particular number of turns $N_{auxiliary}$ is substantially proportional to the total number of lamp assemblies that are adapted for operating in series together.

2. The lamp assembly of claim 1 wherein the transformer core is a first transformer core and the input winding is a first input winding, and wherein the first transformer core, the first input winding, and the auxiliary winding form a first driving inductor, and the lamp assembly further comprises a second driving inductor having a second transformer core disposed around another portion of the lamp envelope and a second input winding disposed on the second transformer core and adapted to connect to the ballast.

3. The lamp assembly of claim 2 wherein the second input winding has a particular number of turns, $N_{input}$, equal to the particular number of turns of the first input winding.

4. The lamp assembly of claim 1 further comprising a load balancing capacitor connected to the transformer core and adapted to connect to the ballast.

5. The lamp assembly of claim 1 wherein the input winding has a center tap that is connected to a ground conductor.

6. An electric lamp system comprising:
    a ballast adapted to power a total number of one or more lamp assemblies connected to the ballast, wherein the ballast supplies to the one or more lamp assemblies a predetermined radio frequency power that is independent of the total number of the one or more lamp assemblies that are connected to the ballast; and
    a plurality of lamp assemblies adapted to connect together in series and to connect to the ballast, wherein each of the plurality of lamp assemblies includes an electrodeless gas discharge lamp, and each of the plurality of lamp assemblies includes a driving inductor configured to split the radio frequency power among each of the plurality of electrodeless gas discharge lamps to produce a discharge in the lamp envelope from the split radio frequency power.

7. The electric lamp assembly of claim 6 wherein the driving inductor of each of the plurality of lamp assemblies comprises:
    a transformer core disposed around a portion of the lamp envelope;
    an input winding disposed on the transformer core, the input winding having a particular number of turns, $N_{input}$; and
    an auxiliary winding disposed on the transformer core and adapted to connect to the ballast and to couple with the input winding, the auxiliary winding having a particular number of turns, $N_{auxiliary}$;
    wherein the particular number of turns, $N_{input}$, of the input winding and the particular number of turns, $N_{auxiliary}$, of the auxiliary winding are selected so that the driving inductor splits the radio frequency power among each of the plurality of electrodeless gas discharge lamps.

8. The electric lamp assembly of claim 7 wherein the input winding has a center tap that is connected to a ground conductor.

9. The electric lamp system of claim 6 wherein the driving inductor includes a first driving inductor having a transformer core disposed around a first portion of the lamp envelope, and the driving inductor includes a second driving inductor having a transformer core disposed around a second portion of the lamp envelope.

10. The electric lamp system of claim 6 further comprising a plurality of load balancing capacitors, wherein each load balancing capacitor of the plurality of load balancing capacitors corresponds to one of the electrodeless gas discharge lamps, and each load balancing capacitor is connected between the electrodeless gas discharge lamp and the ballast.

11. The electric lamp system of claim 6 further comprising a load balancing capacitor connected between the ballast and the plurality of lamp assemblies.

12. An interconnect circuit adapted to connect between a ballast and a lamp set, the interconnect circuit comprising:
    an input terminal adapted to connect to the ballast and to receive an input current from the ballast;
    a current transformer configured to generate an output current to a lamp set that has a particular total number of series-connected lamp assemblies by stepping down the input current received from the ballast as a function of the particular total number of the series-connected lamp assemblies, the current transformer including:
    a current transformer core;
    a first current transformer primary winding and a second current transformer primary winding, wherein the first and second current transformer primary windings are bifilar-wound around the current transformer core; and a current transformer secondary winding single wound around the current transformer core, wherein the current transformer secondary winding has a particular number of windings $N_{secondary}$ selected as a function of the particular number of the series-connected lamp assemblies in the lamp set; and an output terminal adapted to connect to the lamp set and to provide the output current generated by the current transformer to the lamp set.

13. The interconnect circuit of claim 12 further comprising a load balancing capacitor connected at the input terminal and to the current transformer.

14. The interconnect circuit of claim 12 further comprising a load balancing capacitor connected at the output terminal and to the current transformer.

15. The interconnect circuit of claim 12 wherein the ballast is a radio frequency converter and each of the series-connected lamp assemblies includes an electrodeless gas discharge lamp.

16. An electric lamp system comprising:

a ballast adapted to power one or more lamp assemblies, wherein the ballast supplies radio frequency power independent of a quantity of the one or more lamp assemblies that are powered from the ballast;

a lamp set of lamp assemblies that are adapted to connect together in series, wherein each lamp assembly in the lamp set includes an electrodeless gas discharge lamp having a closed-loop, tubular lamp envelope enclosing mercury vapor and a buffer gas, and each lamp assembly in the lamp set includes a first driving inductor and a second driving inductor, wherein the lamp set has a total number of the electrodeless gas discharge lamps; and a transformer connected between the ballast and the lamp set, wherein the transformer is configured to split the radio frequency power supplied by the ballast among each of the electrodeless gas lamps in the lamp set;

wherein the first and second driving inductors of each of the lamp assemblies of the lamp set are configured to receive the split radio frequency power from the transformer and to produce a discharge in the lamp envelope.

17. The electric lamp system of claim 16 wherein the transformer is configured to step down current provided by ballast as a function of total number of electrodeless gas discharge lamps in the lamp set.

18. The electric lamp system of claim 16 wherein the transformer is a bifilar-wound transformer.

19. The electric lamp system of claim 16 further comprising a load balancing capacitor connected between the transformer and the ballast.

20. The electric lamp system of claim 16 further comprising a plurality of load balancing capacitors, wherein each load balancing capacitor of the plurality of load balancing capacitors corresponds to one of the electrodeless gas discharge lamps of the lamp set, and each load balancing capacitor is connected between the transformer and electrodeless gas discharge lamp.

* * * * *